(12) United States Patent
Burke et al.

(10) Patent No.: US 9,626,309 B1
(45) Date of Patent: Apr. 18, 2017

(54) METHOD AND CONTROLLER FOR REQUESTING QUEUE ARBITRATION AND COALESCING MEMORY ACCESS COMMANDS

(71) Applicant: MICROSEMI STORAGE SOLUTIONS (U.S.), INC., Aliso Viejo, CA (US)

(72) Inventors: Bradley Burke, Roseville, CA (US); Keith Graham Shaw, Port Coquitlam (CA)

(73) Assignee: Microsemi Storage Solutions (U.S.), Inc., Aliso Viejo, CA (US)

( * ) Notice: Subject to any disclaimer, the term of this patent is extended or adjusted under 35 U.S.C. 154(b) by 358 days.

(21) Appl. No.: 14/322,556

(22) Filed: Jul. 2, 2014

(51) Int. Cl.
*G06F 12/00* (2006.01)
*G06F 13/16* (2006.01)
*G06F 13/364* (2006.01)

(52) U.S. Cl.
CPC ........ *G06F 13/1642* (2013.01); *G06F 13/364* (2013.01)

(58) Field of Classification Search
USPC .................. 710/260–269, 104–119, 240–244
See application file for complete search history.

(56) References Cited

U.S. PATENT DOCUMENTS

| | | | | |
|---|---|---|---|---|
| 6,360,339 B1* | 3/2002 | Labatte | ............... | H04L 12/2602 714/704 |
| 7,162,550 B2* | 1/2007 | Douglas | ................ | G06F 13/102 709/233 |
| 7,788,435 B2* | 8/2010 | Worthington | ......... | G06F 9/4812 710/263 |
| 7,864,806 B2* | 1/2011 | Qiu | ........................ | H04L 49/90 370/474 |
| 7,949,813 B2* | 5/2011 | Mizrachi | ................. | G06F 13/24 710/260 |
| 8,200,857 B2 | 6/2012 | Noeldner et al. | | |
| 2003/0191835 A1* | 10/2003 | Hauck | ................. | G06F 11/2097 709/224 |
| 2006/0259707 A1* | 11/2006 | Freytag | ............... | G06F 12/0831 711/146 |
| 2008/0091868 A1* | 4/2008 | Mizrachi | ................. | G06F 13/24 710/263 |

FOREIGN PATENT DOCUMENTS

EP        1032241        8/2000

\* cited by examiner

*Primary Examiner* — Raymond Phan
(74) *Attorney, Agent, or Firm* — Dennis R. Haszko

(57) ABSTRACT

Controller and method for requesting arbitration of a queue. The controller comprises a coalescing engine for determining a number of commands in a queue and requesting arbitration of the queue when a coalescing condition is satisfied. The method comprises determining the number of commands in a queue and requesting arbitration of the queue when a coalescing condition is satisfied.

20 Claims, 7 Drawing Sheets

METHOD AND CONTROLLER FOR REQUESTING QUEUE ARBITRATION AND COALESCING MEMORY ACCESS COMMANDS

FIELD

The present disclosure relates generally to the field of computing devices. More particularly, the present disclosure relates to controllers and management of queues.

BACKGROUND

An input/output controller (IO controller) within a server or system exchanges information between devices. Typically, these devices are peripheral devices such as disk drives connected through the IO controller to a host computer processing unit (host CPU). By offloading the responsibility of exchanging information to the IO controller, this permits the host CPU to perform other functions.

The small computer system interface (SCSI) is a set of standards that define different transport protocols for the exchange of information from the host CPU to or from the devices such as disk drives. There are various SCSI transport protocols including PCI Express Queuing Interface (PQI) and SCSI over PCIe which is known as SOP and collectively called PQI/SOP or SCSIe. There are also other similar non-SCSI standards such as Non-volatile Memory Express (NVMe).

The typical operation of the IO controller is as follows: the IO controller retrieves a command from the host CPU for processing; the IO controller processes the command which typically comprises moving a data block from one location or device to another; when command has completed and the data has been exchanged, the IO controller sends a response to the host CPU indicating whether the exchange completed successfully or failed. Any server or system comprising an IO controller can post commands (such as IO reads or writes) to the IO controller, and can check the response from the IO controller to determine if the commands succeeded or failed.

The SCSIe and NVMe standards, among others, define a circular queuing interface for the transport of the commands and responses to and from a host CPU connected to the IO controller. Circular queues reside in the host memory space. There may be one or more circular queues in the system. When a command is received in an incoming queue, the queue is scheduled for arbitration. The arbitration scheme may be a round robin arbitration scheme. When a queue is selected for processing by the IO controller, the IO controller fetches the command from the queue and processes the command. A response from the command is then posted by the IO controller to the outgoing queue on the host CPU. After the IO controller has processed incoming commands and outgoing responses it writes to the host CPU memory to update the queue index.

The host interface is shared by both the control path and the data path. Commands and responses are transferred between the host CPU and IO controller on the same host interface or bus which the data blocks, themselves, are transferred. IO controller performance is measured by the number of data blocks per second that can be transferred successfully over the host interface or bus. Commands and responses are, essentially, overhead for data block transfers and reduce the overall performance of the IO controller.

Accordingly, it is desirable to efficiently transfer commands and responses between the host CPU and IO controller on the host interface so the transfer of data blocks has maximum bandwidth and throughput. Minimizing the impact of transferring commands and responses over the shared interface is important for improving the performance of the IO controller.

Figure 1:
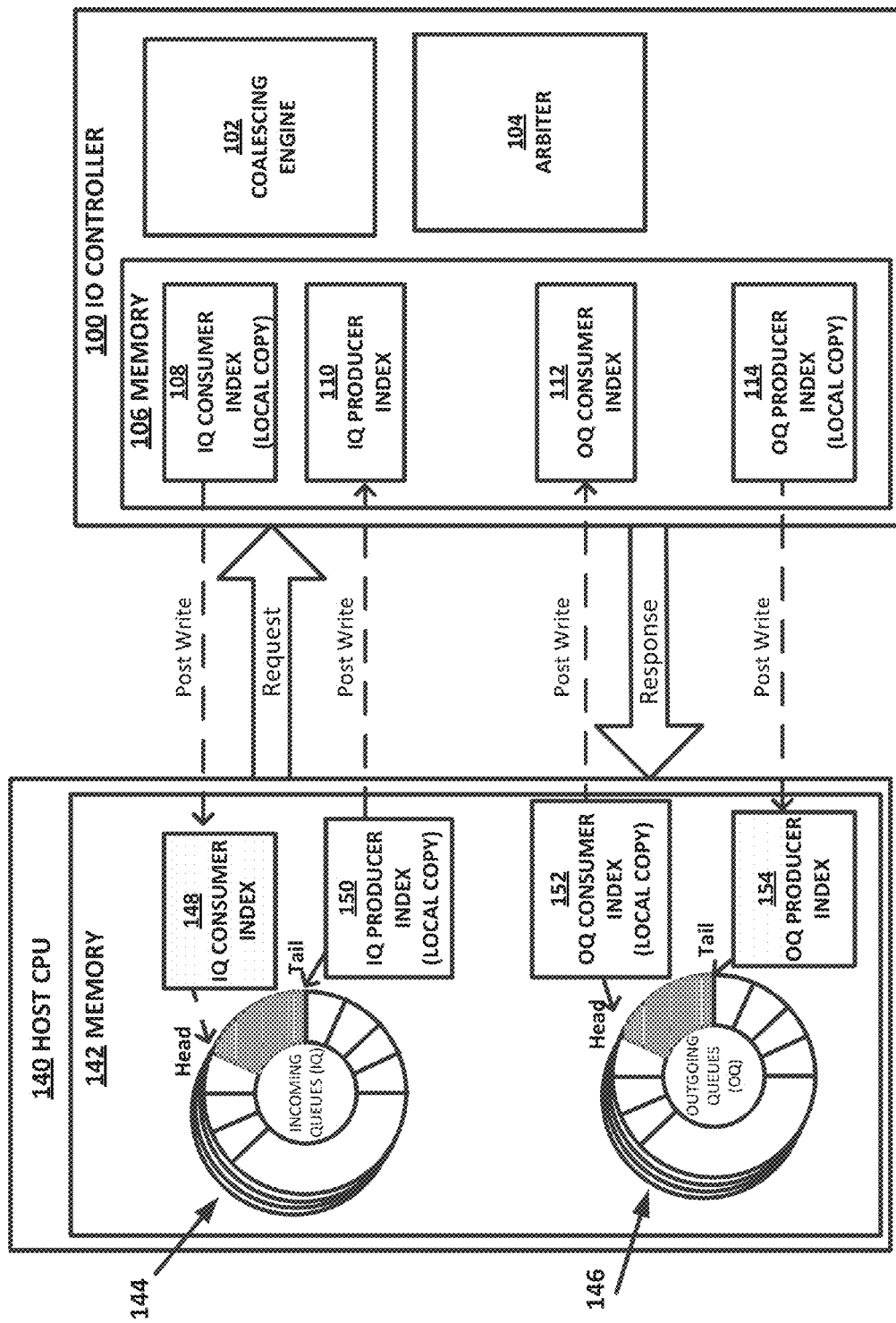
FIG. 1 shows an IO controller in accordance with an embodiment of the present disclosure.

Embodiments of the present disclosure will now be described, by way of example only, with reference to the attached Figures.

DETAILED DESCRIPTION

A controller and method are provided for optimizing the number of commands or responses a controller transfers in one operation from or to a host through queues in a multi-queue environment. Current solutions in the market employ simple schemes such as round robin arbitration to select the next queue to service, and then service the queue up to the arbitration burst value if it has one or more commands or responses to process. A problem with such known approaches is that when there are many queues in a system receiving commands at different rates, a simple round robin arbitration scheme causes the controller to operate inefficiently. Specifically, the read or write transfer sizes for requests and responses are not optimized, causing additional traffic to and from the host.

In an embodiment of the present disclosure, a coalescing engine coalesces commands and responses prior to permitting their transfer between the host CPU and the IO controller on the host interface in one operation. Coalescing is the process of accumulating one or more commands or responses until a threshold number is reached before permitting their transfer in one operation. Circular queues with fixed queue element sizes lend themselves well to coalescing. It is more efficient to read multiple commands in one large read or request operation over the host interface than to read or request multiple commands in many smaller read operations. Similarly, it is more efficient to send multiple responses as one large write or post operation instead of multiple write or post operations.

Coalescing can also be applied to updating the queue indexes after processing commands or posting responses. Instead of continuously writing the index value back to the host index every time it changes, the index value is only written back in response to a minimum change. Reducing the number of memory write transactions to update the indexes also helps reduce overhead.

Coalescing queues before requesting arbitration helps ensure that the IO controller combines multiple inbound reads or multiple outbound writes into one operation and improves efficiency and performance for command and response processing. Also, coalescing the delta (change) in the queue index values helps reduce the number of index write backs.

In an example embodiment, in a multi-queue environment, an IO controller coalesces commands and responses in a manner that ensures that the maximum number of commands, responses, and index updates occur in every operation. Command rates per queue may, however, vary. Accordingly, in accordance with an embodiment of the present disclosure, the overall IO controller performance is improved by maximizing the number of commands being coalesced in a queue but also maintaining quality of service for all queues. In an embodiment, to improve the quality of service (fairness, latency, and throughput) experienced by commands across all of the queues, the IO controller one or more of reduces or increases the number of commands processed in one operation, reduces or increases the number of commands coalesced in a queue before requesting arbitration, increases the minimum time before a queue is requested for arbitration, and decreases the maximum time before a queue with only one command is requested for arbitration.

In accordance with an embodiment of the present disclosure, a method for requesting arbitration of a selected queue from a plurality of queues on a host in a system is described. The system comprises a controller, the method comprising receiving memory access commands in a selected queue of the plurality of queues, the memory access commands being intended for processing by the controller; coalescing the memory access commands in the selected queue until a threshold number of commands has been coalesced, the threshold number of commands being greater than one and equal to or less than a maximum number of commands that can be processed by the controller in an operation; and in response to the threshold number of commands having been coalesced, requesting arbitration of the selected queue. The threshold number of commands may be equal to or less than an arbitration burst value of the controller. The selected queue may be requested for arbitration prior to the threshold number of commands having been coalesced and in response to at least one memory access command having been coalesced in the selected queue and in response to expiry of a coalescing timer associated with a time at which the selected queue was processed by the controller. The selected queue may be requested for arbitration in response to the threshold number of commands having been coalesced and in response to a minimum amount of time having elapsed since the selected queue was last processed by the controller. The host may be connected to the controller by a bus and the memory access commands are transported between the host and controller using a PCIe Queuing Interface (PQI) or Non-volatile Memory Express (NVMe) protocol. The queues may comprise circular queues.

In accordance with an embodiment of the present disclosure, a method for requesting arbitration of a selected queue from a plurality of queues is disclosed. The method comprises receiving, at a controller, a command count indicator associated with a number of memory access commands in the selected queue, the memory access commands being intended for processing by the controller; determining the number of commands in the selected queue based on the command count indicator; inhibiting arbitration of the selected queue while the determined number of commands is below a threshold number of commands, the threshold number of commands being greater than one and equal to or less than a maximum number of commands that can be processed by the controller in an operation; and in response to the determined number of commands meeting the threshold number of commands, requesting arbitration of the selected queue. Requesting arbitration of the selected queue may be performed in response to a minimum coalescing time being reached, and in response to the determined number of memory access commands meeting the threshold number of commands. In response to reaching a maximum coalescing time, the threshold number of memory access commands may be set to one, such that arbitration of the selected queue is requested in response to the maximum coalescing time being reached and the determined number of commands being at least one. In accordance with an embodiment of the present disclosure, responses for the selected queue are be generated, the responses indicating whether the memory access commands of the selected queue were successfully processed by the controller; the responses are coalesced in the controller or; and in response to a threshold number of responses being coalesced, responses are provided to the selected queue.

In accordance with another embodiment of the present disclosure, a controller for communication with a host, the host comprising a memory defining a selected queue of a plurality of queues, the queues for receiving memory access commands to be processed by the controller is described. The controller comprises a memory for storing a received command count indicator, the received command count indicator being associated with a number of memory access commands in the selected queue; a coalescing engine configured to determine a number of memory access commands in the selected queue based on the command count indicator, inhibit arbitration of the selected queue while the determined number of commands is below a threshold number of commands, the threshold number of commands being greater than one and equal to or less than a maximum number of commands that can be processed by the controller in an operation; and in response to the determined number of commands meeting the threshold number of commands, request arbitration of the selected queue. In the coalescing engine, requesting arbitration of the selected queue may be performed in response to a minimum coalescing time being reached, and in response to the determined number of memory access commands meeting the threshold number of commands. In the coalescing engine, in response to a maximum coalescing time is reached, the threshold number of memory access commands may be set to one, such that arbitration of the selected queue is requested in response to the maximum coalescing time being reached and the determined number of commands being at least one. The coalescing engine may be further configured to generate responses for the selected queue, the responses indicating whether the memory access commands of the selected queue were successfully processed by the controller; coalesce the responses in the controller; and in response to a threshold number of responses being coalesced, provide the responses to the selected queue. The host may connect to the controller by a peripheral component interconnect express (PCIe) bus. The host may connect to the controller by a small computer system interface express (SCSIe) bus. The host may connect to the controller by a bus and the memory access commands are transported between the host and controller using a Non-volatile Memory Express (NVMe) protocol. The queues may comprise circular queues.

In accordance with an embodiment of the present disclosure, a controller for communication with a host, the host comprising a memory defining a selected queue of a plurality of queues, the queues for receiving memory access commands to be processed by the controller is disclosed. The controller comprises a memory for storing a received command count indicator, the received command count indicator being associated with a number of memory access commands in the selected queue; a coalescing engine configured to determine a number of memory access commands in the selected queue based on the command count indicator, inhibit arbitration of the selected queue while a coalescing condition has not been satisfied; and in response to a coalescing condition being satisfied, requesting arbitration of the selected queue.

In accordance with an embodiment of the present disclosure, a method for producing memory access responses from a controller to a selected queue of a plurality of queues on a host is disclosed. The method comprises generating response for the selected queue, the responses indicated whether memory access commands of the selected were successfully processed by the controller; coalescing the responses in the controller; and in response to a threshold number of responses being coalesced, producing the responses to the selected queue.

Other aspects and features of the present disclosure will become apparent to those ordinarily skilled in the art upon review of the following description of specific embodiments in conjunction with the accompanying figures.

FIG. 1 shows an IO controller 100 in accordance with an embodiment of the present disclosure. The IO controller 100 is connected via a host interface or bus with a host CPU 140. The bus may implement the PQI/SOP, or NVMe protocols. The host CPU 140 comprises a memory space 142. The memory space 142 includes a plurality of pairs of circular incoming queues 144 and circular outgoing queues 146. A pair of queues 144, 146 may be associated with a source of commands such as, for example, a network interface or a hard drive. Each incoming queue 144 and outgoing queue 146 is divided into segments of a fixed and known size, and each segment has a corresponding base memory address.

Each incoming queue 144 comprises a consumer index 148 which points to the memory address at the head of the incoming queue 144. Each incoming queue 144 also has a corresponding local copy of an outgoing queue producer index 150 which points to the memory address at the tail of the incoming queue 144.

The IO controller 100 comprises a coalescing engine 102, an arbiter 104, and a memory 106. The memory 106 comprises a local copy of an incoming queue consumer index 108 for each incoming queue 144. The local copy of the incoming queue consumer index 108 contains the same address (points to the same memory address at the head of the incoming queue 144 on the host CPU 140) as the corresponding incoming queue consumer index 148. The memory 106 also comprises an incoming queue producer index 110 which contains the same address as the corresponding local copy of the incoming queue producer index 150 on the host CPU 140.

During operation, memory access commands are received in the host CPU 140 and added at the tail of the corresponding incoming queue 144. The memory access commands are intended for processing by the IO controller 100. As commands are added to a incoming queue 144, a command count indicator, indicating the number of commands received or in the incoming queue 144, is sent to the IO controller 100. This is so that the IO controller 100 knows how many commands reside in the incoming queue 144. In an embodiment, the local copy of the incoming queue producer index 150 is updated with the tail address, and the tail address is written to the incoming queue producer index 110 on the IO controller 100 as the command count indicator.

The coalescing engine 102 monitors the difference between the local copy of the incoming queue consumer index 108 and the incoming queue producer index 110 to determine how many commands reside in the corresponding incoming queue 144 on the host CPU 140. The coalescing engine 102 lets the commands coalesce or collect in the corresponding incoming queue 144 until a desired number is reached. In an embodiment, commands are coalesced until a threshold number of commands in the incoming queue 144 is reached. The threshold number of commands can be referred to as the queue depth or queue state. In an embodiment, the threshold number of commands is the IO controller 100 burst value. The burst value is the maximum number of commands the IO controller 100 can process in one operation.

Once a threshold number of commands in an incoming queue 144 is reached, the coalescing engine 102 requests arbitration of that queue 144 from the arbiter 104. The arbiter 104 may use a round robin arbitration scheme to determine which queue, from the requested queues, should be processed next by the IO controller 100. By only requesting arbitration of incoming queues 144 that have accumulated a threshold number of commands, this effectively reorders how queues are requested for arbitration and reschedules processing the incoming queues 144.

When the arbiter 104 selects the next incoming queue 144 for the IO controller 100 to process, the IO controller 100 reads or requests multiple commands from the incoming queue 144 at once in one operation. In an embodiment, the number of commands read by the IO controller 100 in one operation is equal to the burst value. By having the IO controller 100 process more than one command from an incoming queue 144 in one read operation, the total amount of bus overhead for sending commands from the host CPU 140 to the controller 100 is reduced.

In response to the IO controller 100 receiving commands from an incoming queue 144, the local copy of that incoming queue consumer index 108 is updated to reflect the address of the new head of the incoming queue 144. In an embodiment, the address of the new head is written to the incoming queue consumer index 148 on the host CPU 140 immediately after the IO controller 100 receives the commands. In an alternate embodiment, the address of the new head is coalesced on the controller 100 until the incoming queue 144 has been read by the controller 100 more than once. Coalescing the new head address further reduces the usage of the host interface for command phase transactions so as to improve IO controller performance. The host CPU 140 needs to know the head address of the incoming queue 144 to determine whether the incoming queue 144 can accept further commands. The host CPU 140 does not need to know immediately, however, the most current head address which permits coalescing thereof.

Figure 2:
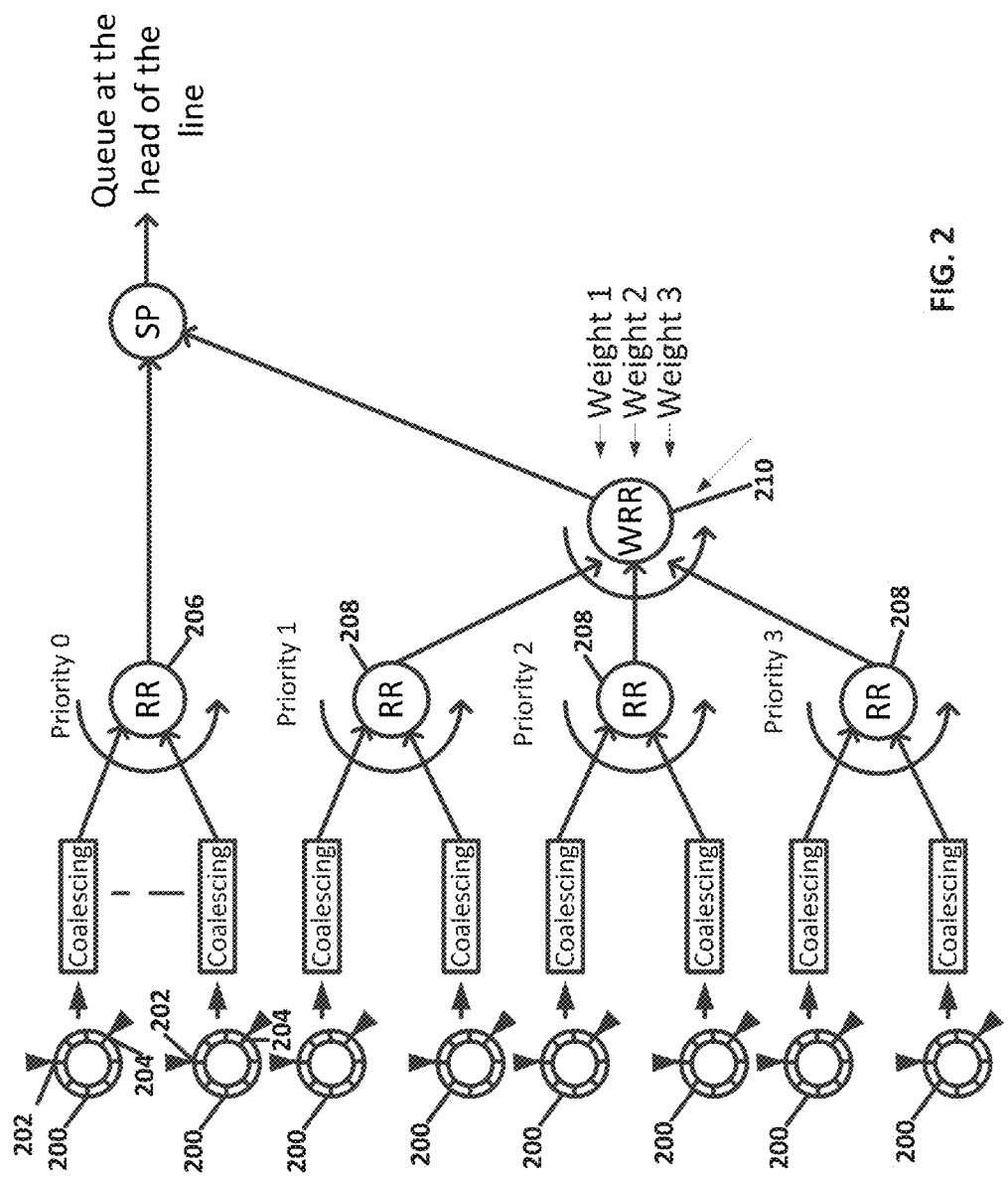
FIG. 2 shows a process diagram of multiple circular queues being coalesced and scheduled using a two-level arbiter in accordance with an embodiment of the present disclosure.

FIG. 2 shows multiple circular queues 200 being coalesced prior to the queues 200 being requested for arbitration in a two-level arbiter. Each of the queues 200 is coalesced until the number of commands on any of the queues reaches a threshold number. The number of commands on a queue is determined by taking the difference between the producer index 202 and consumer index 204 for the specific queue. In response to a queue having the selected coalescing depth, the queue is requested for arbitration in round robin arbiters 206 and 208. One round robin arbiter 206 is not subject to any weighting prior to a result being sent to a strict priority (SP) queue. A plurality of round robin arbiters 208 are processed by a weighted round robin arbiter 210 to determine which queue therefrom will be processed next by the IO controller. Each of the round robin arbiters 208 is assigned a weight according to their priority, and the next queue of round robin arbiters 208 with a higher weight will be more likely to be selected by the weighted round robin arbiter 210 for being the next queue processed by the IO controller.

Referring again to FIG. 1, once commands have been processed by the 10 controller 100, a response is generated for each command and transferred to the host CPU 140 so the host CPU 140 knows whether the command completed successfully or failed. Each outgoing queue 146 comprises a local copy of an outgoing queue consumer index 152 and an outgoing queue producer index 154. The local copy of the outgoing queue consumer index 152 points to the head of the corresponding outgoing queue 146 which contains the next response the host CPU 140 will read from the outgoing queue 146. The outgoing queue producer index 154 points to the tail of the corresponding outgoing queue 146 which is the segment on which a response from the IO controller 100 will be placed.

The IO controller 100 also comprises an outgoing queue consumer index 112 and a local copy of an outgoing queue producer index 114 for each outgoing queue 146. The outgoing queue consumer index 112 contains the address of the local copy of the outgoing queue consumer index on the host CPU 140 which corresponds to the head of the outgoing queue 140. The local copy of the outgoing queue producer index 114 contains the address of the outgoing queue producer index 154 on the host CPU 140 which corresponds to the tail of the outgoing queue 140.

By taking the difference between an outgoing queue consumer index 112 and a local copy of an outgoing queue producer index 114, the IO controller 100 determines whether the corresponding outgoing queue 146 has sufficient space for receiving further responses. As the host CPU 140 reads responses from the head of the outgoing queue 146, the local copy of the outgoing queue consumer index 150 is updated with the new head address, and the address is also written to the outgoing queue consumer index 112.

In accordance with an embodiment of the present disclosure, the IO controller 100 coalesces responses for an outgoing queue 146 on the IO controller 100 until a threshold number of responses have been coalesced or collected. This permits multiple responses to be written to the outgoing queue 146 in one operation. Writing multiple responses to an outgoing queue 146 in the same operation helps further reduce the host interface bandwidth consumed for the control path.

Once responses are written to an outgoing queue 146, the local copy of the outgoing queue producer index 114 on the IO controller 100 is updated to reflect the new address of the tail of the outgoing queue 154. The new address of the tail is also written to the outgoing queue producer index 154 on the host CPU 140. In an embodiment, the new addresses of the tail is coalesced on the IO controller 100 for multiple response operations. In other words, instead of writing the new address of the tail to the outgoing producer index 154 each time after one or more responses are written to an outgoing queue 146, the new address of the tail is updated and retained on the local copy of the outgoing queue producer index 114. The new address of the tail is only written to the outgoing queue producer index 154 once a number of separate response operations have occurred. The coalescing engine 102 monitors the delta or change from the value of the local copy of the outgoing producer index 114, and the value of the local copy of the outgoing producer index 114 the last time it was written to the host CPU 140 outgoing producer index 154. Once the delta or change reaches a threshold number, the new value is written to the host memory. This threshold number is configured independently of any other coalescing threshold.

Coalescing commands in incoming queues 144 prior to arbitration reschedules processing of the queues by the IO controller 100 such that queues that meet the target queue depth are processed before queues that do not meet the target queue depth. In an example embodiment, the target queue depth is the threshold number of commands required by a queue before it is requested for arbitration.

Delaying processing incoming queues 144 can result in data transfer latency since commands on the queues will not be processed until a sufficient number of commands have been received by the queues. It is important, however, that long term quality of service (including fairness) is maintained across all queues and that data latency is similar to that which would be experienced by equal priority round robin arbitration without queue coalescing. Reducing the threshold number required for the coalescing depth can improve data latency, especially if incoming queues 144 are receiving commands at very different rates. In accordance with an embodiment of the present disclosure, data latency can also be improved by providing a maximum amount of time (timeout) for which an incoming queue 144 is coalesced before being requested for arbitration. This allows incoming queues 144 which are receiving commands at lower rates to still be serviced by the IO controller 100 without being starved.

Figure 3:
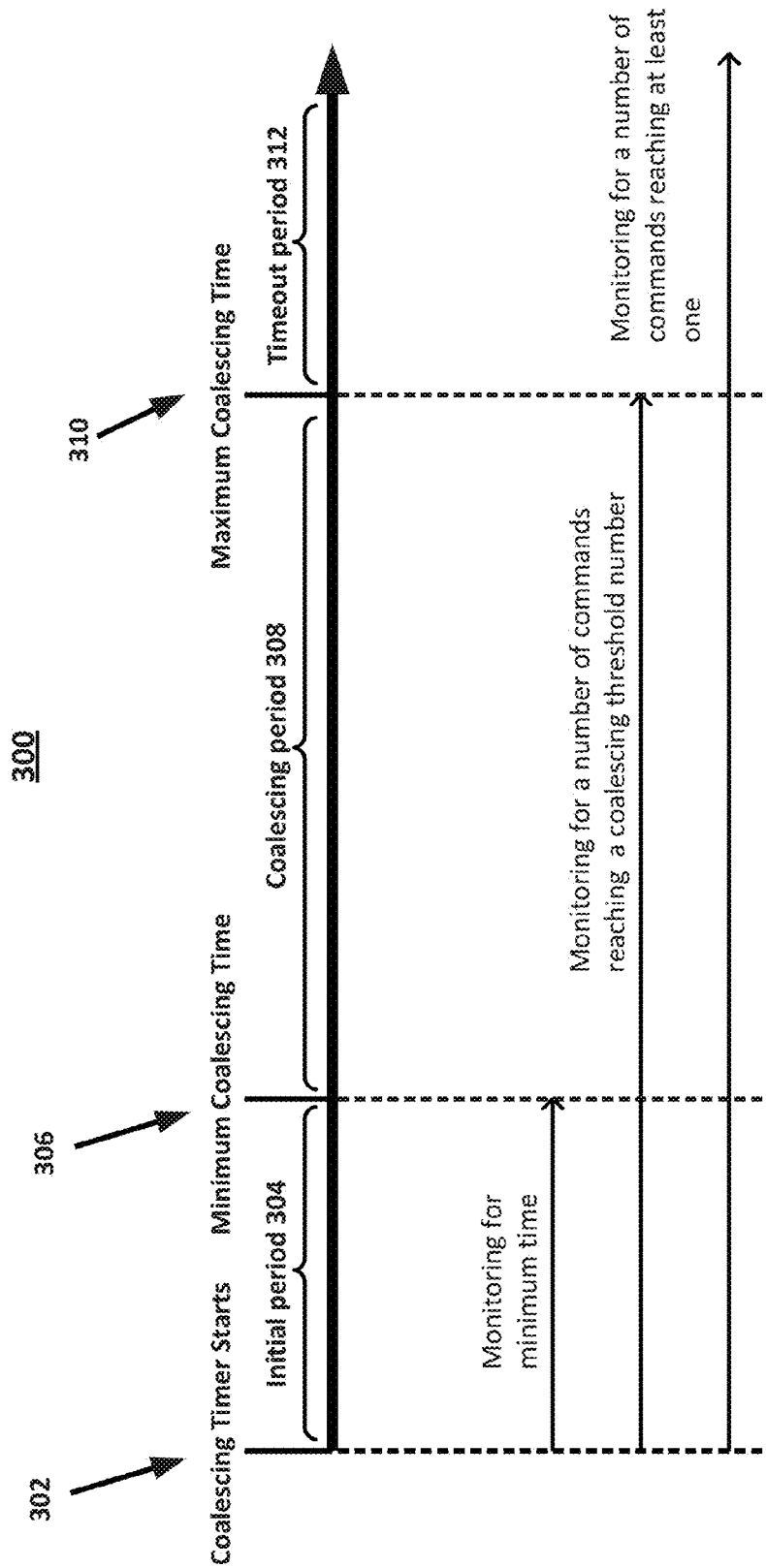
FIG. 3 shows a timing diagram for a coalescing engine in accordance with an embodiment of the present disclosure.

FIG. 3 shows a timing diagram 300 for the coalescing engine 102 of FIG. 1 in accordance with an embodiment of the preset disclosure. The coalescing engine 102 coalesces commands in a selected queue until a coalescing condition is satisfied. In response to the coalescing condition being satisfied, the coalescing engine 102 requests arbitration of the selected queue. In an implementation, the coalescing condition is satisfied if a threshold number of commands are in the queue. In another implementation, the coalescing condition is satisfied if a minimum amount of time such as a minimum coalescing time 306 has elapsed and a threshold number of commands are in the queue, the threshold number of commands being greater than one command. In another implementation, the coalescing condition is satisfied if a maximum amount of time, such as a maximum coalescing time 310, has elapsed and there is at least one command in the queue for processing by the IO controller 100.

In response to an incoming queue 144 being read or processed by an IO controller 100, a coalescing timer is started 302 for that specific incoming queue 144. During an initial period 304 from starting the coalescing timer, the incoming queue 144 is not requested for arbitration irrespective of the number of commands that are received or residing therein. The IO controller 100 effectively inhibits arbitration of the incoming queue 144 entirely. The coalescing engine 102 monitors the coalescing timer for a minimum coalescing time 306. The minimum coalescing time 306 helps maintain overall quality of service for commands in all queues. After a minimum amount of time has elapsed, namely, the minimum coalescing time 306, and for a coalescing period 308 up until a maximum coalescing time 310, the coalescing engine monitors whether the number of commands in the corresponding incoming queue 144 has reached a selected number, namely, a queue depth or coalescing depth. If the coalescing depth has been reached, the IO controller 100 requests arbitration of the incoming queue 144. If the queue depth has not been reached, the controller 100 further inhibits arbitration of the incoming queue 144 by not requesting arbitration of the queue to the arbiter 104.

The coalescing engine determines the queue depth of an incoming queue 144 based on the command count indicator. In an embodiment, to determine the queue depth of the incoming queue 144, the coalescing engine 102 takes the difference between the local copy of the incoming queue consumer index 108 and the incoming queue producer index 110.

During a coalescing period (which is after the minimum amount of time), in response to the incoming queue 144 reaching the coalescing depth, the coalescing engine 102 requests arbitration of the incoming queue 144 to the arbiter 104. Once the incoming queue 144 is serviced, the coalescing timer is restarted. In response, however, to the expiry of the coalescing timer as a result of exceeding the maximum coalescing time 310, and for a timeout period 312 thereafter, the coalescing engine 102 monitors whether the incoming queue 144 has at least one command therein. Effectively, this sets the threshold number of memory access commands to one. In response to at least one command residing in the incoming queue 144 during the timeout period 312, the coalescing engine 102 requested arbitration of the incoming queue 144 to the arbiter 104.

The coalescing engine provides a configurable minimum coalescing time 306, a configurable maximum coalescing time 310, as well as a configurable minimum and maximum coalescing or queue depth. The coalescing depth may or may not be the same value as the arbitration burst value or limit of the IO controller. The arbitration burst value is the maximum number of commands that can be processed by the IO controller to provide fairness and quality of service across all the incoming queues, and to ensure one queue is not serviced by the IO controller more than its fair share before granting other incoming queues an opportunity to be serviced by the IO controller. The coalescing depth is always less than or equal to the arbitration burst value. It may be desirable to set a coalescing depth lower than the arbitration burst value to balance latency of command processing by the 10 controller so as to improve IO controller efficiency.

Figure 4:
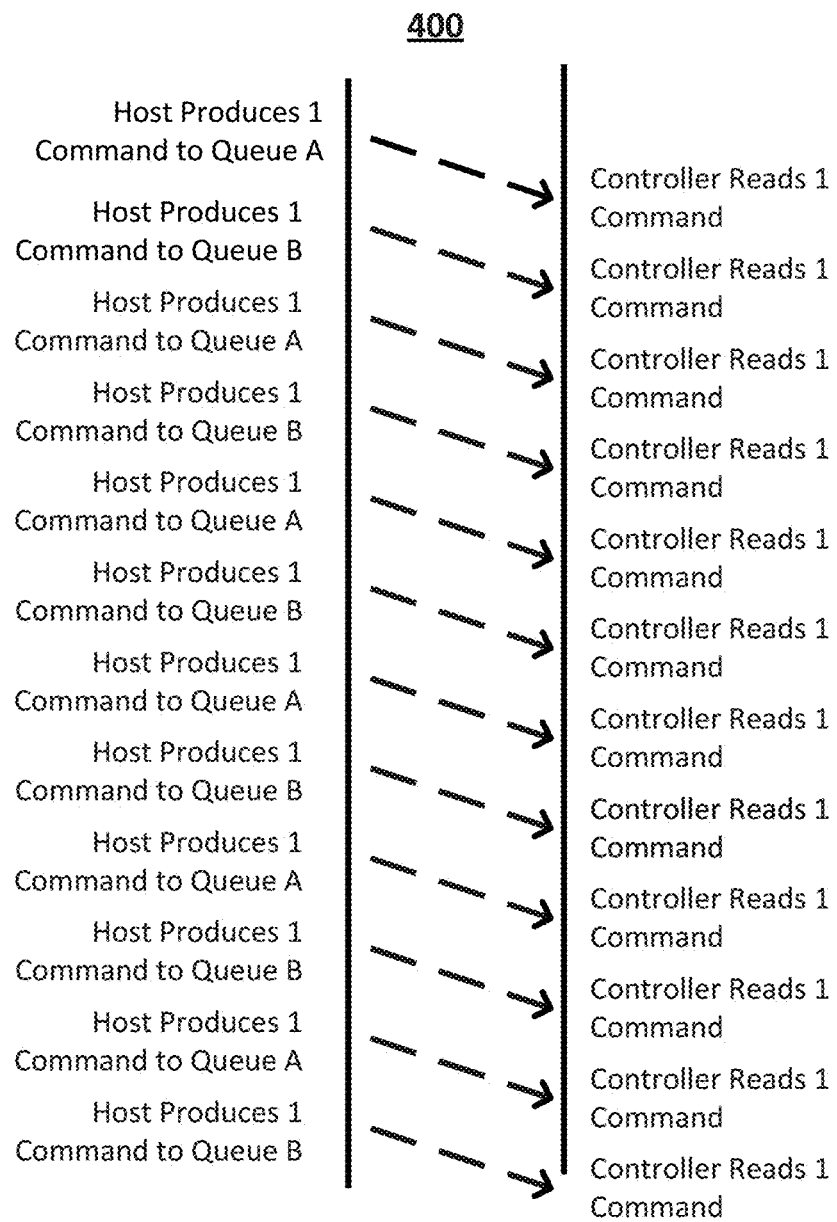
FIG. 4 shows a timing diagram for the reading of commands on two incoming queues with simple round robin arbitration.

FIG. 4 shows a timing diagram 400 for the reading of 12 commands on two incoming queues, queue A and B, with simple round robin arbitration. Timing diagram 400 shows the commands being produced to both queues A and B at the same rate. The IO controller can process the commands at a same or greater rate that the host CPU can produce the commands. When commands are produced to either queue A or queue B, the incoming queue is immediately arbitrated by the arbiter for reading by the IO controller. This results in the IO controller reading no more than one command from the incoming queues for each read or operation. Accordingly, 12 reads or operations are issued by the IO controller to process all 12 commands, and 12 responses were transferred back to the host CPU and placed on the outgoing queues. Assuming a command size of 64 bytes (B), a PCIe transport layer packet (TLP) size of 256B, a read and response size of 64B, each, and an overhead for each read and response of 16B, the total efficiency would be 67% (12×64B/12×(16B+16B+64B)).

Figure 5:
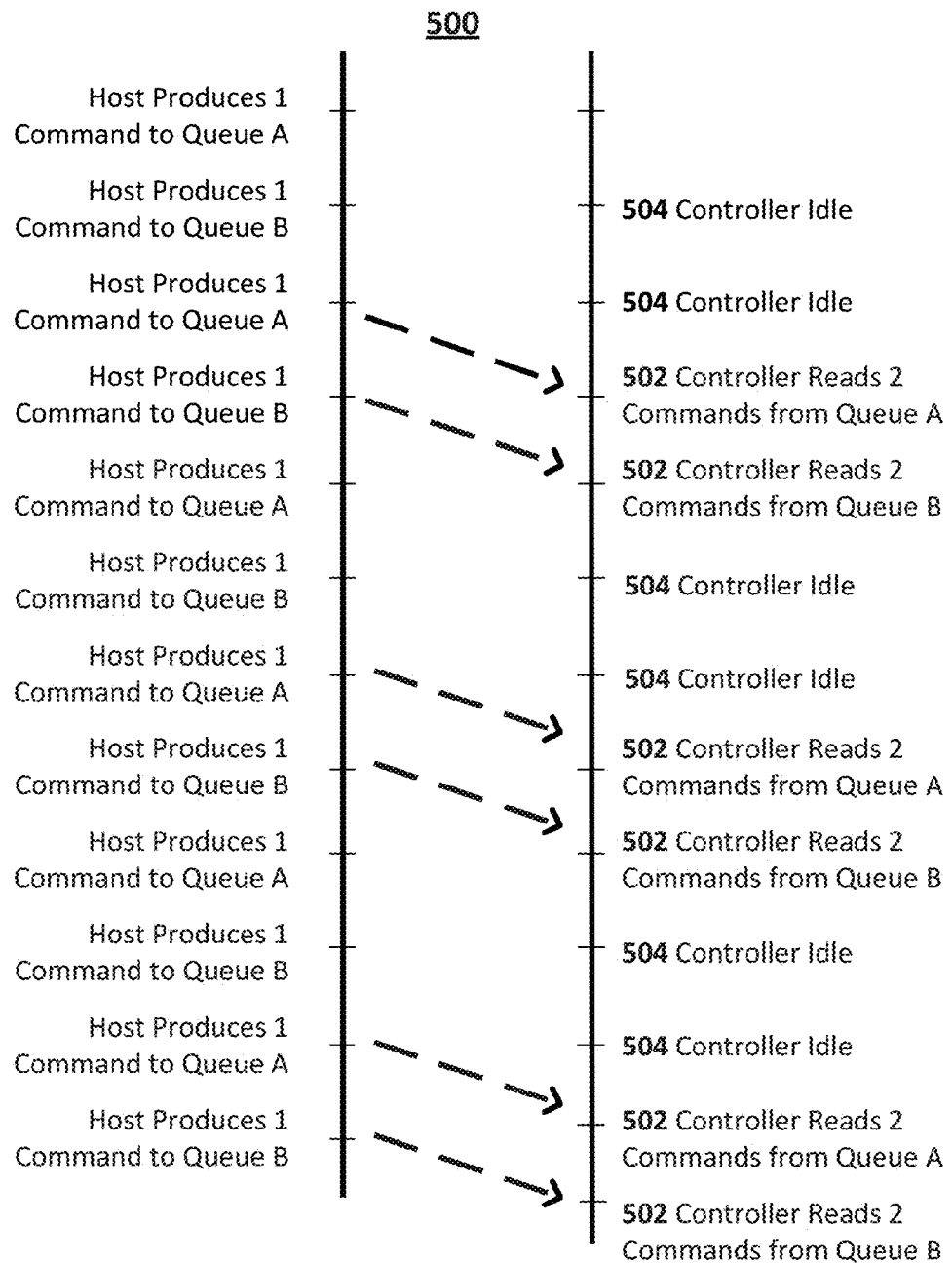
FIG. 5 shows a timing diagram for coalescing commands on incoming queues using the IO controller of FIG. 1.

FIG. 5 shows a timing diagram 500 of coalescing commands on incoming queues A and B using an IO controller and host CPU similar to those shown in FIG. 1 in accordance with an embodiment of the present disclosure. The commands are produced to each queue A, B at the same rate. The coalescing depth is 2. To process the 12 commands, the IO controller issues 6 reads 502 to the host CPU. As shown, the IO controller is idle at 6 points in time 504 while neither queue A nor queue B has the minimum queue depth for requesting for arbitration. Assuming the command size is 64B, the maximum PCIe TLP size is 256 bytes, the controller issued 6 different reads and the host returned 6 TLP completions each comprising 128B, the overhead for each read is approximately 16B and the completion overhead is also approximately 16B, the total efficiency for all 6 reads would be 80% (6×128B/(6×(16B+16B+128B)). Coalescing commands to a depth of 2 increases the efficiency of the controller for processing commands from 67% (as shown in FIG. 4) to 80%, and reduces the number of transfers by 50% (from 12 reads and 12 responses to 6 reads and 6 responses).

Figure 6:
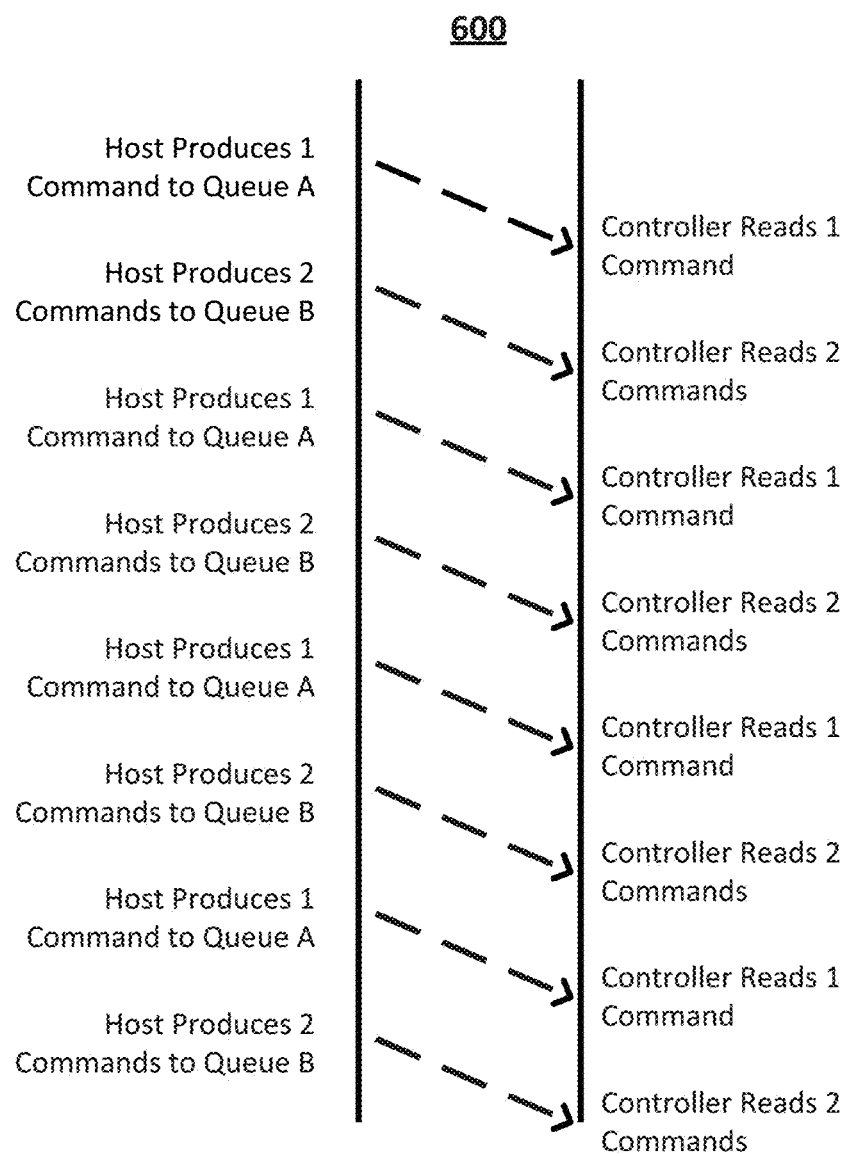
FIG. 6 shows a timing diagram for the reading of commands on two incoming queues with simple round robin arbitration.

FIG. 6 shows a timing diagram 600 for the reading of 12 commands on two incoming queues, queue A and B, with simple round robin arbitration. The commands are produced to queue B at twice the rate they are produced to queue A. The IO controller can process the commands at a same or greater rate that the host CPU can produce the commands. To process the 12 commands, the IO controller issued 8 reads to the host CPU. Assuming the command size is 64B, the maximum PCIe TLP size is 256B, the IO controller issued 8 different reads and the host returned 8 TLP completions wherein 4 of the completions were 64B and 4 of the completions were 128B, and the overhead for each read and completion is approximately 16B, the total efficiency would be 75% ((4×64+4×128)/(8×16B+4×(16B+64B)+4×(16B+128B))).

Figure 7:
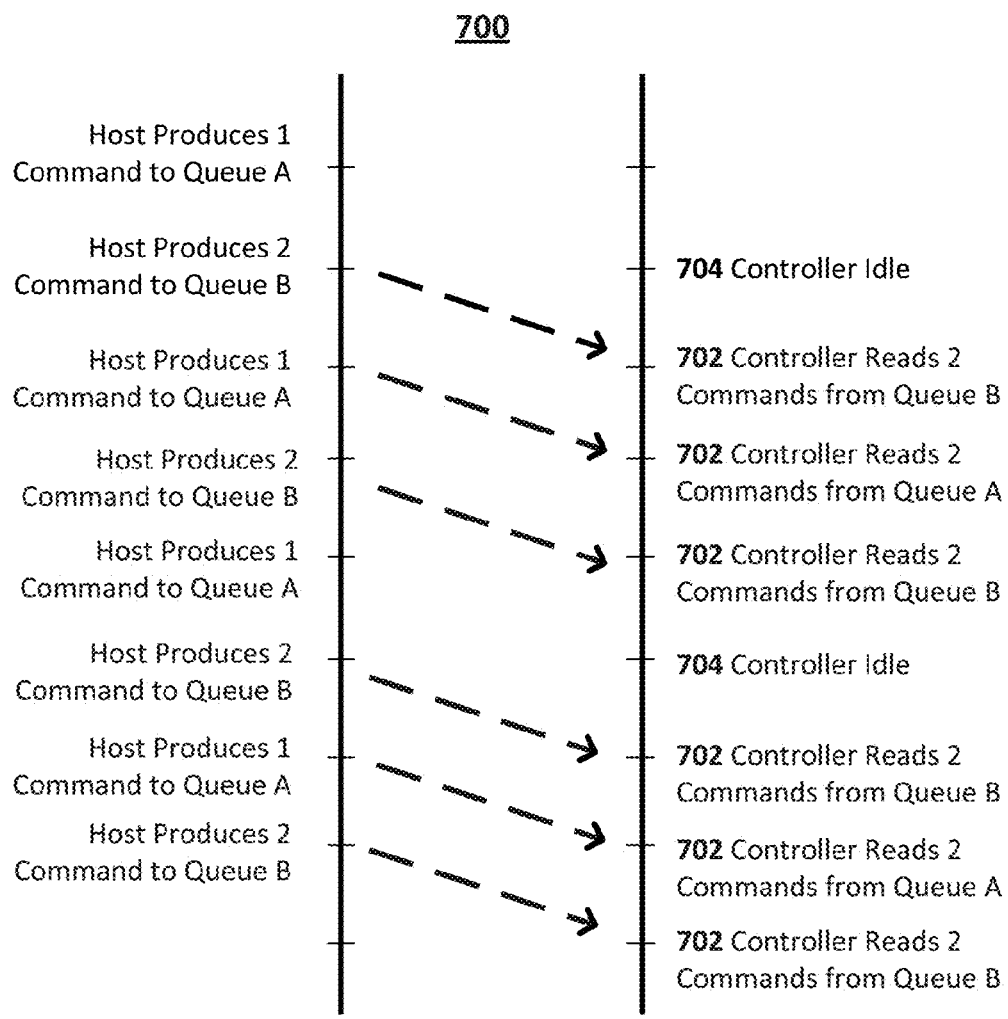
FIG. 7 shows another timing diagram for coalescing commands on incoming queues using the IO controller of FIG. 1.

FIG. 7 shows another timing diagram 700 of coalescing commands on incoming queues A and B using an IO controller and host CPU similar to those shown in FIG. 1 in accordance with an embodiment of the present disclosure. The commands are produced to queue B at twice the rate they are produced to queue A. The coalescing depth is 2. To process the 12 commands, the IO controller issues 6 reads 702 to the host CPU. As shown, the IO controller is idle at two points in time 704 while queue A does not have the minimum queue depth for requesting for arbitration. Assuming the command size is 64B, the maximum PCIe TLP size is 256 bytes, the controller issued 6 different reads 702 and the host returned 6 TLP completions each comprising 128B, the overhead for each read is approximately 16B and the completion overhead is also approximately 16B, the total efficiency for all 6 reads would be 80% (6×128B/(6×(16B+16B+128B)).

Timing diagrams 500 and 700 both show an increase in efficiency for transferring commands from the host CPU to the IO controller at the expense of a slight increase in latency in processing commands resulting from waiting for the selected queue depth, and a decrease in the total number of transfers.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skilled in the art without departing from the scope, which is defined solely by the claims appended hereto.

What is claimed is:

1. A method for requesting arbitration of a selected queue from a plurality of queues on a host in a system, the system comprising a controller, the method comprising:
    receiving memory access commands in a selected queue of the plurality of queues, the memory access commands being intended for processing by the controller;
    coalescing the memory access commands in the selected queue until a threshold number of commands has been coalesced, the threshold number of commands being greater than one and equal to or less than a maximum number of commands that can be processed by the controller in an operation;
    inhibiting arbitration of the selected queue while the number of coalesced commands is below the threshold number of commands; and
    in response to the threshold number of commands having been coalesced, requesting arbitration of the selected queue.

2. The method of claim 1, wherein the threshold number of commands is equal to or less than an arbitration burst value of the controller.

3. The method of claim 1, wherein the selected queue is requested for arbitration prior to the threshold number of commands having been coalesced and in response to at least one memory access command having been coalesced in the selected queue and in response to expiry of a coalescing timer associated with a time at which the selected queue was processed by the controller.

4. The method of claim 1, wherein the selected queue is requested for arbitration in response to the threshold number of commands having been coalesced and in response to a minimum amount of time having elapsed since the selected queue was processed by the controller.

5. The method of claim 1, wherein the host is connected to the controller by a Peripheral Component Interconnect Express (PCIe) bus and the memory access commands are transported between the host and controller using a PCIe Queuing Interface (PQI) or a Non-volatile Memory Express (NVMe) protocol.

6. The method of claim 1, wherein the queues comprise circular queues.

7. A method for requesting arbitration of a selected queue from a plurality of queues, the method comprising:
    receiving, at a controller, a command count indicator associated with a number of memory access commands in the selected queue, the memory access commands being intended for processing by the controller;
    determining the number of commands in the selected queue based on the command count indicator;
    inhibiting arbitration of the selected queue while the determined number of commands is below a threshold number of commands, the threshold number of commands being greater than one and equal to or less than a maximum number of commands that can be processed by the controller in an operation; and
    in response to the determined number of commands meeting the threshold number of commands, requesting arbitration of the selected queue.

8. The method of claim 7 wherein requesting arbitration of the selected queue is performed in response to a minimum coalescing time being reached, and in response to the determined number of memory access commands meeting the threshold number of commands.

9. The method of claim 7, wherein, in response to reaching a maximum coalescing time, the threshold number of memory access commands is set to one, such that arbitration of the selected queue is requested in response to the maximum coalescing time being reached and the determined number of commands being at least one.

10. The method of claim 7, further comprising;
    generating responses for the selected queue, the responses indicating whether the memory access commands of the selected queue were successfully processed by the controller;
    coalescing the responses in the controller; and
    in response to a threshold number of responses being coalesced, providing the responses to the selected queue.

11. A controller for communication with a host, the host comprising a memory defining a selected queue of a plurality of queues, the queues for receiving memory access commands to be processed by the controller, the controller comprising:
    a memory for storing a received command count indicator, the received command count indicator being associated with a number of memory access commands in the selected queue;
    a coalescing engine configured to:
    determine a number of memory access commands in the selected queue based on the command count indicator,
    inhibit arbitration of the selected queue while the determined number of commands is below a threshold number of commands, the threshold number of commands being greater than one and equal to or less than a maximum number of commands that can be processed by the controller in an operation; and
    in response to the determined number of commands meeting the threshold number of commands, request arbitration of the selected queue.

12. The controller of claim 11 wherein, in the coalescing engine, requesting arbitration of the selected queue is performed in response to a minimum coalescing time being reached, and in response to the determined number of memory access commands meeting the threshold number of commands.

13. The controller of claim 11, wherein, in the coalescing engine, in response to a maximum coalescing time is reached, the threshold number of memory access commands is set to one, such that arbitration of the selected queue is requested in response to the maximum coalescing time being reached and the determined number of commands being at least one.

14. The controller of claim 11, wherein the coalescing engine is further configured to:
generate responses for the selected queue, the responses indicating whether the memory access commands of the selected queue were successfully processed by the controller;
coalesce the responses in the controller; and
in response to a threshold number of responses being coalesced, provide the responses to the selected queue.

15. The controller of claim 11 wherein the host connects to the controller by a peripheral component interconnect express (PCIe) bus.

16. The controller of claim 11 wherein the host connects to the controller by a small computer system interface express (SCSIe) bus.

17. The controller of claim 11 wherein the host connects to the controller by a Non-volatile Memory Express (NVMe) bus.

18. The controller of claim 11 wherein the queues comprise circular queues.

19. A controller for communication with a host, the host comprising a memory defining a selected queue of a plurality of queues, the queues for receiving memory access commands to be processed by the controller, the controller comprising:
a memory for storing a received command count indicator, the received command count indicator being associated with a number of memory access commands in the selected queue;
a coalescing engine configured to:
determine a number of memory access commands in the selected queue based on the command count indicator,
inhibit arbitration of the selected queue while a coalescing condition has not been satisfied; and
in response to a coalescing condition being satisfied, requesting arbitration of the selected queue.

20. A method for producing memory access responses from a controller to a selected queue of a plurality of queues on a host, the method comprising:
generating responses for the selected queue, the responses indicating whether memory access commands of the selected queue were successfully processed by the controller;
coalescing the responses in the controller; and
in response to a threshold number of responses being coalesced, producing the responses to the selected queue.

* * * * *